US012794241B2

(12) United States Patent
Deutsch

(10) Patent No.: US 12,794,241 B2
(45) Date of Patent: Nov. 10, 2026

(54) ULTRACAPACITOR MODULE WITH DEAD BAND VOLTAGE CONTROL SYSTEM

(71) Applicant: Aptiv Technologies AG, Schaffhausen (CH)

(72) Inventor: Robert Deutsch, Shelby Township, MI (US)

(73) Assignee: Aptiv Technologies AG, Schaffhausen (CH)

( * ) Notice: Subject to any disclaimer, the term of this patent is extended or adjusted under 35 U.S.C. 154(b) by 507 days.

(21) Appl. No.: 18/515,740

(22) Filed: Nov. 21, 2023

(65) Prior Publication Data

US 2024/0171061 A1 May 23, 2024

Related U.S. Application Data

(60) Provisional application No. 63/462,332, filed on Apr. 27, 2023, provisional application No. 63/427,179, filed on Nov. 22, 2022.

(51) Int. Cl.
*H02J 7/34* (2006.01)
*H02M 1/00* (2007.01)
(Continued)

(52) U.S. Cl.
CPC ........... *H02J 7/345* (2013.01); *H02M 1/0022* (2021.05); *H02M 1/143* (2013.01); *H02M 1/322* (2021.05); *H02M 3/1582* (2013.01)

(58) Field of Classification Search
CPC ...... H02J 7/345; H02M 1/0022; H02M 1/143; H02M 1/322; H02M 3/1582
(Continued)

(56) References Cited

U.S. PATENT DOCUMENTS 7,599,167 B2 10/2009 Doljack
8,080,971 B2 * 12/2011 Bose ....................... B60L 53/11 429/408
(Continued)

FOREIGN PATENT DOCUMENTS

CN 101170263 A 4/2008
CN 202503323 U 10/2012
(Continued)

OTHER PUBLICATIONS

"Extended European Search Report for EP Application No. 24215714.7"; European Patent Office; mailed on May 7, 2025; 9 Pages.
(Continued)

*Primary Examiner* — M Baye Diao
(74) *Attorney, Agent, or Firm* — Harness, Dickey & Pierce, P.L.C.

(57) ABSTRACT

An ultracapacitor module includes an ultracapacitor cell stack containing one or more ultracapacitor cells. The ultracapacitor module includes a bidirectional boost/buck DC/DC converter. The ultracapacitor cell stack and the DC/DC converter are configured to be connected in series with a voltage bus of a vehicle. The ultracapacitor module includes a voltage sensor configured to determine an operating voltage Vo of the voltage bus. The ultracapacitor module includes an electronic controller in electrical communication with the DC/DC converter and the voltage sensor. The electronic controller is configured to control the DC/DC converter using a first set of control parameters when an operating voltage Vo is greater than a target bus voltage value Vt, and control the DC/DC converter using a second set of control parameters different from the first set of control parameters when the operating voltage Vo of the voltage bus is less than the target bus voltage value Vt.

13 Claims, 5 Drawing Sheets

(51) Int. Cl.
*H02M 1/14* (2006.01)
*H02M 1/32* (2007.01)
*H02M 3/158* (2006.01)

(58) Field of Classification Search
USPC .......................................................... 320/149
See application file for complete search history.

(56) References Cited

U.S. PATENT DOCUMENTS

| | | | |
|---|---|---|---|
| 8,198,870 B2 | 6/2012 | Zuercher | |
| 8,245,801 B2 * | 8/2012 | Flett | H02J 7/345 180/65.21 |
| 9,209,653 B2 | 12/2015 | Maynard et al. | |
| 9,214,709 B2 | 12/2015 | Cooley et al. | |
| 9,263,948 B1 * | 2/2016 | Vovos | H02M 3/1582 |
| 9,272,627 B2 | 3/2016 | Miller | |
| 9,331,500 B2 | 5/2016 | Knitt et al. | |
| 9,731,609 B2 * | 8/2017 | Ambrosio | B60L 50/11 |
| 9,809,128 B2 | 11/2017 | Berry et al. | |
| 10,272,788 B2 | 4/2019 | Huh et al. | |
| 10,374,440 B2 | 8/2019 | Altemose | |
| 10,596,909 B2 | 3/2020 | Choi et al. | |
| 10,790,769 B2 * | 9/2020 | Wang | H02P 9/006 |
| 10,923,946 B1 | 2/2021 | Cremona et al. | |
| 11,159,038 B2 | 10/2021 | Kaminsky | |
| 11,220,988 B2 | 1/2022 | Ciaccio et al. | |
| 11,288,200 B2 | 3/2022 | Mallory | |
| 2007/0164693 A1 | 7/2007 | King et al. | |
| 2008/0178586 A1 * | 7/2008 | Crisafulli | H02K 7/1823 60/409 |
| 2009/0309416 A1 | 12/2009 | Bose et al. | |
| 2010/0133025 A1 | 6/2010 | Flett | |
| 2012/0235473 A1 | 9/2012 | Jiang et al. | |
| 2012/0237799 A1 | 9/2012 | Jiang et al. | |
| 2015/0097546 A1 * | 4/2015 | Pan | H02M 3/158 323/311 |
| 2015/0148973 A1 | 5/2015 | Ye et al. | |
| 2015/0149799 A1 | 5/2015 | Ye et al. | |
| 2015/0203850 A1 | 7/2015 | Barrat et al. | |
| 2015/0283911 A1 * | 10/2015 | Ambrosio | B60L 50/11 307/10.1 |
| 2017/0203850 A1 | 7/2017 | Wang et al. | |
| 2018/0166892 A1 | 6/2018 | Sepe et al. | |
| 2018/0198290 A1 | 7/2018 | Rohera | |
| 2019/0013753 A1 * | 1/2019 | Wang | H02P 9/006 |
| 2021/0319152 A1 | 10/2021 | Couture et al. | |
| 2022/0190629 A1 | 6/2022 | Varigonda et al. | |

FOREIGN PATENT DOCUMENTS

| | | | |
|---|---|---|---|
| CN | 109496381 A * | 3/2019 | H02J 7/50 |
| CN | 110571781 B * | 10/2022 | H02J 7/865 |
| WO | WO-2008007519 A1 * | 1/2008 | H02J 9/061 |
| WO | 2011090511 A2 | 7/2011 | |
| WO | 2013138380 A2 | 9/2013 | |
| WO | 2022060892 A1 | 3/2022 | |

OTHER PUBLICATIONS

Laadjal, et al., "Supercapacitors Online Parameters Estimation and State-of-Health Determination in Hybrid", 2021 IEEE 13th International Symposium on Diagnostics for Electrical Machines, Power Electronics and Drives (SDEMPED), IEEE, vol. 1, Aug. 22, 2021 (Aug. 22, 2021), pp. 261-266, 6 Pages.
Quintans, et al., "Methodology to Obtain the Voltage-Dependent Parameters of a Fourth-Order Supercapacitor Model With the Transient Response to Current Pulses", IEEE Transactions on Power Electronics, Nstitute of Electrical and Electronics Engineers, USA, vol. 32, No. 5, May 1, 2017 (May 1, 2017), pp. 3868-3878, XP011640395, ISSN: 0885-8993, DOI: 10.1109/TPEL.
Rubartsch, et al., "On-Line Diagnosis of Supply Voltage Stabilizing Capacitors in Automotive Electronic Systems", 2023 IEEE Vehicle Power and Propulsion Conference (VPPC), IEEE, Oct. 24, 2023 (Oct. 24, 2023), pp. 1-6, XP034532389, DOI: 10.1109/VPPC60535.2023.10403181 [retrieved on Jan. 30, 2024], Oct. 24, 2023, 6 Pages.
"Backup Power Supply Modules with Electric Double Layer Capacitors", Panasonic Industry; https://industrial.panasonic.com/ww/products/pt/edlc-backup-power-supply-modules; Last viewed on Nov. 16, 2023.
"Using Supercapacitors with Motors—DC/DC converter?", Electrical Engineering; https://electronics.stackexchange.com/questions/334455/using-supercapacitors-with-motors-dc-dc-converter; Last viewed on Nov. 16, 2023.
Khasiev, Victor , "Bidirectional DC/DC Regulator and Supercapacitor Charger / Design Note DN558: Introduction", Analog Devices; https://www.analog.com/en/technical-articles/bidirectional-dc-dc-regulator-and-supercapacitor-charger.html; last viewed on Nov. 16, 2023.
Reigstad, Marius , "Bidirectional DC-DC Converter for Supercapacitor as DC-bus Stabilization Element", Master's thesis in Energy, The University of Bergen, May 31, 2021., 151 pages.
"Extended European Search Report"; European Patent Office; mailed on May 6, 2024; 5 Pages.
"Extended European Search Report for Application No. 23211444.7"; European Patent Office; Mailed on Apr. 25, 2024; 9 pages.
"Extended European Search Report for Application No. 23211477.7"; European Patent Office; Mailed on May 27, 2025; 8 Pages.
"Extended European Search Report Received for Application No. 23211451.2"; European Patent Office; Mailed on Jun. 6, 2024; 7 Pages.

* cited by examiner

ULTRACAPACITOR MODULE WITH DEAD BAND VOLTAGE CONTROL SYSTEM

CROSS-REFERENCE TO RELATED APPLICATIONS

This application claims the benefit of and priority to U.S. Provisional Application 63/427,179, titled "Ultracapacitor Module with Dead Band Voltage Control System", filed Nov. 22, 2022, and further claims the benefit of and priority to U.S. Provisional Application 63/462,332, titled "Ultracapacitor Module with Dead Band Voltage Control System", filed Apr. 27, 2023, the contents of each of which are incorporated by reference herein.

TECHNICAL FIELD

This disclosure is directed to an ultracapacitor module with dead band bus voltage control system.

BACKGROUND

Typically, an ultracapacitor module connected to a voltage supply bus has no ability to control the current sourced from or provided to the ultracapacitor. An example of this may be found in an ultracapacitor module in a voltage stabilization system that increases the voltage of the voltage supply bus of a vehicle while the starter system of an internal combustion engine is engaged and includes a parallel DC/DC converter to recharge the capacitors in the ultracapacitor module. Another example is a backup power supply module which increases the voltage of the voltage supply bus of a vehicle when the bus voltage sags. This module also includes a parallel DC/DC converter to recharge the capacitors in the ultracapacitor module. These examples have no need for adaptive voltage control because they have no method of controlling a response of the ultracapacitor module to voltage transients on the voltage supply bus. In these examples, the capacitor voltage and the working range of the voltage supply bus are the same. There is no control of the bus voltage other than the natural control provided by the capacitor(s).

SUMMARY

In some aspects, the techniques described herein relate to an ultracapacitor module, including: an ultracapacitor cell stack containing one or more ultracapacitor cells; a bidirectional boost/buck DC/DC converter, wherein the ultracapacitor cell stack and the DC/DC converter are configured to be connected in series with a voltage supply bus of a vehicle; one or more voltage sensors configured to determine an operating voltage Vo of the voltage supply bus; and an electronic controller in electrical communication with the DC/DC converter and the one or more voltage sensors, wherein the electronic controller is configured to: control the DC/DC converter using a first set of control parameters when the operating voltage Vo is greater than a target bus voltage value Vt, and control the DC/DC converter using a second set of control parameters different from the first set of control parameters when the operating voltage Vo is less than the target bus voltage value Vt.

In some aspects, the techniques described herein relate to a method of operating an ultracapacitor module connected to a voltage bus of a vehicle, the ultracapacitor module having an ultracapacitor cell stack containing one or more ultracapacitor cells, a bidirectional boost/buck DC/DC converter, wherein the ultracapacitor cell stack and the DC/DC converter are connected in series with the voltage bus, one or more voltage sensors configured to determine an operating voltage Vo of the voltage bus, and an electronic controller in electrical communication with the DC/DC converter and the one or more voltage sensors, the method including: controlling the DC/DC converter using a first set of control parameters when the operating voltage Vo is greater than a target bus voltage value Vt; and controlling the DC/DC converter using a second set of control parameters different from the first set of control parameters when the operating voltage Vo is less than the target bus voltage value Vt.

In some aspects, the techniques described herein relate to a computer readable medium containing program instructions for operating an ultracapacitor module connected to a voltage bus of a vehicle, the ultracapacitor module having an ultracapacitor cell stack containing one or more ultracapacitor cells, a bidirectional boost/buck DC/DC converter, wherein the ultracapacitor cell stack and the DC/DC converter are connected in series with the voltage bus, one or more voltage sensors configured to determine an operating voltage Vo of the voltage bus, and an electronic controller in electrical communication with the DC/DC converter and the one or more voltage sensors, wherein execution of the program instructions by one or more processors of a computer system causes the electronic controller to carry out: controlling the DC/DC converter using a first set of control parameters when an operating voltage Vo is greater than a target bus voltage value Vt; and controlling the DC/DC converter using a second set of control parameters different from the first set of control parameters when the operating voltage Vo is less than the target bus voltage value Vt.

BRIEF DESCRIPTION OF THE DRAWINGS

The ultracapacitor module will now be described, by way of example with reference to the accompanying drawings, in which.

DETAILED DESCRIPTION

Figure 1:
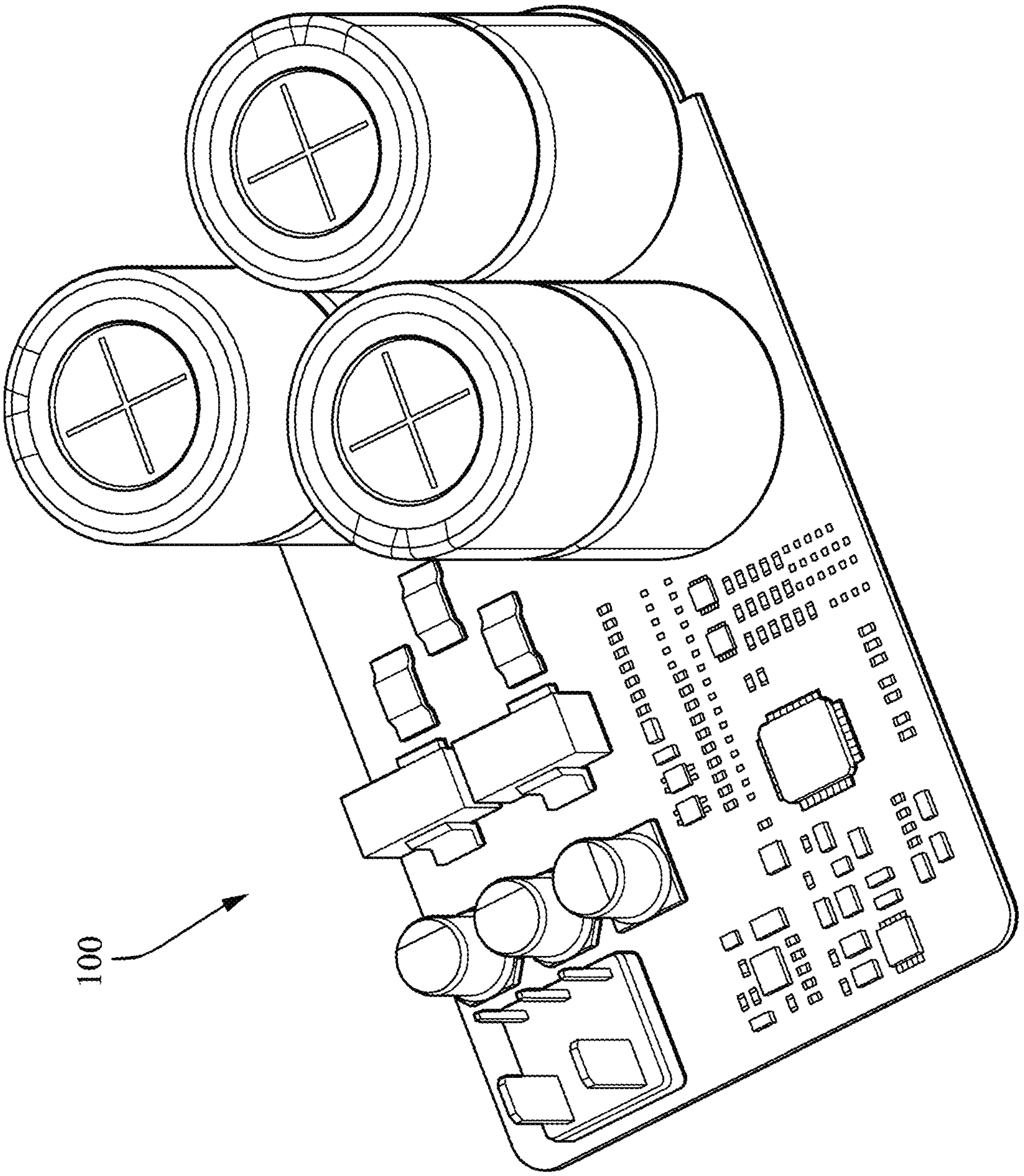
FIG. 1 is an isometric view of an ultracapacitor module according to some embodiments.

The present disclosure describes an ultracapacitor module shown in FIG. 1, hereafter referred to as the UCM 100. The UCM 100 addresses many of the deficiencies of the prior art described above. The UCM 100 in this example protects the voltage supply bus in a vehicle, e.g., an internal combustion engine vehicle, a hybrid electric vehicle, or an electric vehicle, from voltage sags or flyback voltage spikes caused by the switching of high current draw loads on and off on the voltage supply bus, e.g., electric antilock brakes, electric power steering, etc., thereby providing protection from voltage sags and flyback voltage spikes having a duration of 100 microseconds to 100 milliseconds to other electronic modules on the voltage supply bus. The UCM 100 may also or alternatively be configured provide emergency back-up power to satisfy safety critical systems, such as brake-by-wire or power door locks, for 1 to 2 seconds, in case of a loss of the primary electrical power supply in order to meet the necessary automotive safety integrity level (ASIL) of these systems, such as defined by the International Standards Organization (ISO) 26262-1:2001 Road Vehicle Functions Safety Standard.

Figure 2:
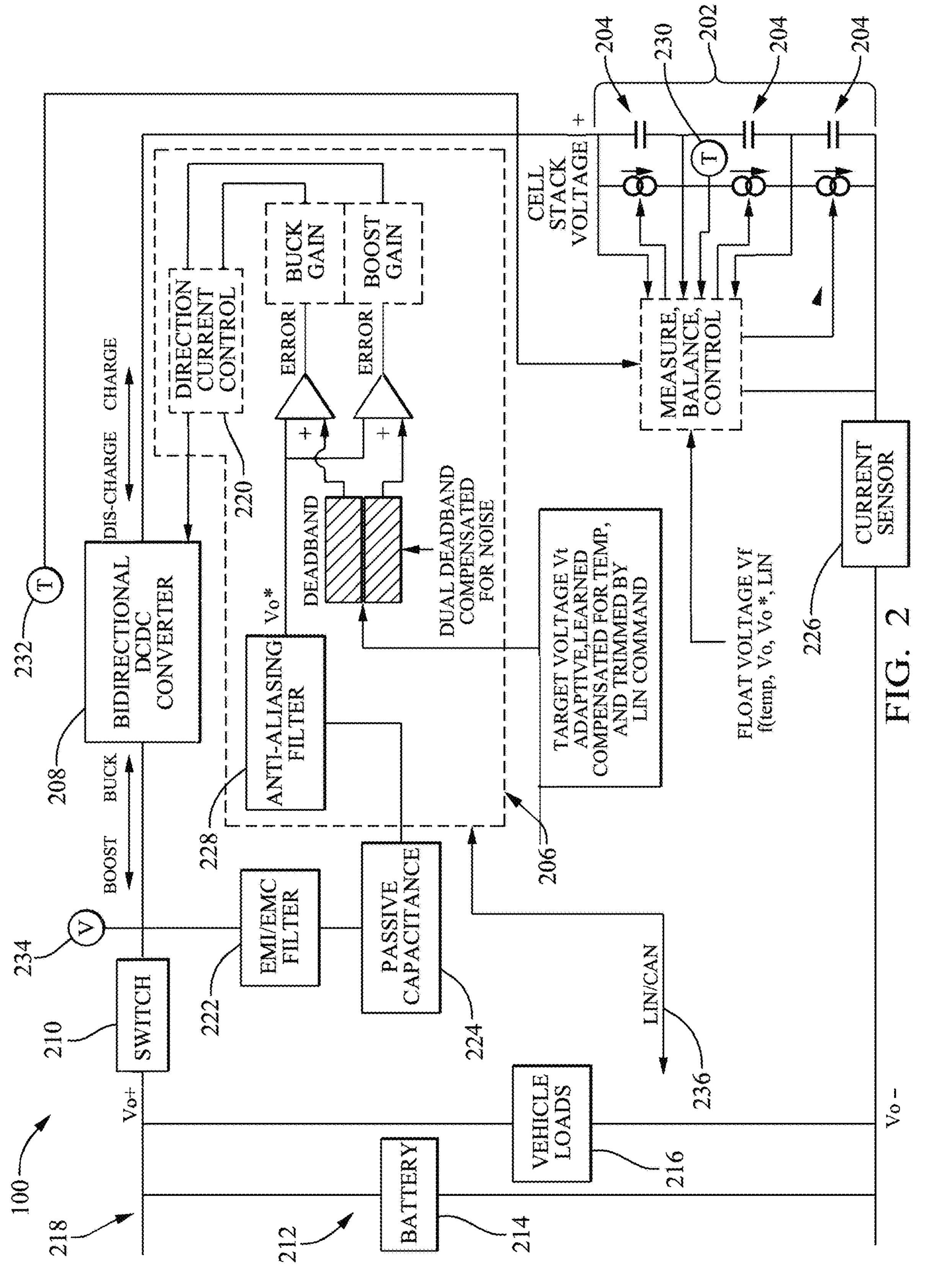
FIG. 2 is a schematic diagram of system components of an ultracapacitor module according to some embodiments.

FIG. 2 is a block diagram of vehicle electrical system 212 utilizing ultracapacitor module 100 according to some embodiments. In some embodiments, vehicle electrical system 212 includes one or more power sources 214 (e.g., battery, alternator, etc.), one or more vehicle loads 216, a voltage supply bus 218, and the UCM 100. UCM 100 is connected to the voltage supply bus 218 and is configured to selectively provide power to the voltage supply bus 218 (boost mode) or receive power from the voltage supply bus 218 (buck mode). The voltage on the voltage supply bus 218 is designated as operating voltage Vo and may also be referred to as bus voltage.

As shown in FIG. 2, the UCM 100 includes an ultracapacitor cell stack 202 that has several ultracapacitor cells 204. As used herein, an ultracapacitor cell is a capacitive storage device having a capacitance of at least 100 farads. In this example three 325 farad, 2.7 volt ultracapacitor cells 204 are connected in series, thereby providing the ultracapacitor cell stack 202 with an equivalent capacitance of 108 farads and a working range of 5.0 to 8.4 volts. The configuration of the ultracapacitor cell stack 202 could be 3S1P (3 cells in series and 1 parallel string with 108F and 8.4V max) as in this example, or it could be 3S2P (3 cells in series and 2 parallel strings with 217F and 8.4V max), or in general xSyP. The ultracapacitor cell stack 202 is configured to operate at currents up to 200 amperes. The UCM 100 also includes an electronic controller 206 which controls the voltage of each ultracapacitor cell 204 and thereby controls the voltage of the ultracapacitor cell stack 202. The electronic controller 206 has one or more processors and memory. The processors may be microprocessors, application specific integrated circuits (ASIC), or built from discrete logic and timing circuits (not shown). Software instructions that program the processors may be stored in a non-volatile memory device (not shown). The memory device may be contained within the microprocessor or ASIC. Alternatively, the memory device may be a separate device. Non-limiting examples of the types of memory device that may be used include electrically erasable programmable read only memory (EEPROM), masked read only memory (ROM), and flash memory devices.

The UCM 100 further includes a bidirectional boost/buck DC/DC converter 208 that is capable of conducting at least the same current as the ultracapacitor cell stack 202 as the current flows in to or out of the ultracapacitor cell stack 202. Under the control of the electronic controller 206, the DC/DC converter 208 quickly switches between boost and buck modes. The time period for this transition is preferably in the order of 25 to 100 microseconds. Other electronic modules connected to the voltage supply bus 218 may also include capacitors that are appropriately sized to provide electrical power to these electronic modules during voltage transients on the voltage supply bus 218 while the DC/DC converter 208 is transitioning between boost and buck modes. The electronic controller 206 also controls the direction and the magnitude of electrical power flowing through the DC/DC converter 208. The electronic controller 206 additionally monitors the voltage of the voltage supply bus 218 and adaptively determines its nominal value, its rate of change, and, optionally, its frequency spectrum content. The UCM 100 may optionally include a switch 210 to protect against reverse polarity voltage.

In some embodiments, UCM 100 includes a plurality of ultracapacitor cells 204 connected in series with one another to form an ultracapacitor cell stack 202, a DC/DC converter 208, a switch 210 and an electronic controller 206. As shown in FIG. 2, DC/DC converter 208 is connected in series between the plurality of ultracapacitor cells 204 and the voltage supply bus 218. In general, UCM 100 operates by monitoring the operating voltage Vo on the voltage supply bus 218 and selectively operating DC/DC converter 208 to supply power to the voltage supply bus 218 when the operating voltage Vo falls below a threshold or target bus voltage value Vt (boost mode) and to receive power from the voltage supply bus 218 when the operating voltage Vo is above the threshold or target bus voltage value Vt (buck mode). To prevent the DC/DC converter 208 from oscillating between boost and buck modes, a dead band is set around the target bus voltage value Vt. The DC/DC converter 208 does not operate in boost mode until the operating voltage Vo is at or less than a lower dead band limit and the DC/DC converter 208 will continue to operate in boost mode until the operating voltage Vo is raised/boosted back to the target bus voltage value Vt (or within an acceptable tolerance of the target bus voltage value Vt). Similarly, the DC/DC converter 208 does not operate in buck mode until the operating voltage Vo is at or above an upper dead band limit and the DC/DC converter 208 will continue to operate in buck mode until the operating voltage Vo is lowered/bucked back to the target bus voltage value Vt (or within an acceptable tolerance of the target bus voltage value Vt). The dead band is typically selected to accommodate variations in the operating voltage Vo, which may be affected by wire and connector resistance, ambient temperature, vehicle-to-vehicle variances, component tolerances, system life stage, and electrical noise. In some embodiments, the UCM 100 accounts for variations in the operating voltage Vo that allows for utilization of a smaller dead band voltage range, as described in more detail below. In particular, in some embodiments the UCM 100 uses a table of voltage values (initial voltage value Vi) and corresponding temperatures. At vehicle start-up, a temperature is measured corresponding to an ambient temperature or a temperature of the UCM 100 is measured and the initial voltage value Vi for the corresponding temperature is selected from the table and is used to determine the target bus voltage value Vt. The voltage values in the table may be selectively updated over time in order to account for variances that are measured in the system. In this way, the UCM 100 is able to utilize learned voltage values to minimize the dead band voltage range that may otherwise be required. In some embodiments, the target bus voltage value Vt may also be adjusted during operation of the UCM 100 based on additional inputs received from the vehicle regarding actual or expected loads, events, etc.

As shown in FIG. 2, electronic controller 206 is configured to monitor the operation of DC/DC converter 208 and includes a direction and current control block 220 to provide commands for controlling the operation of DC/DC converter 208. Monitoring may include utilizing one or more sensors 234 to monitor the operating voltage Vo of the voltage supply bus 218. Monitoring may further include monitoring ultracapacitor cell stack temperature. Electronic controller 206 provides as a command the direction of power flow (buck/boost) and a target voltage/current for the DC/DC converter 208. As described in more detail below, the electronic controller 206 may further modify the target bus voltage Vt based on additional inputs received from the vehicle regarding actual or expected loads, events, etc. By controlling the target bus voltage Vt and controlling the direction of power (buck/boost), the dead band voltage range may be significantly narrowed. Electronic controller 206 is also configured to monitor and control the operation of the ultracapacitor cell stack 202, including monitoring the balance, state of health (SOH), state of charge (SOC), diagnostics, safety, temperature, etc. associated with the ultracapacitor cell stack 202.

As shown in FIG. 2, UCM 100 may also include an electromagnetic interference/electromagnetic compliance (EMI/EMC) filter 222 and passive capacitance 224 between the voltage supply bus 218 and the voltage sensing input of the electronic controller 206 which then passes through an anti-aliasing filter 228 within the electronic controller 206. The UCM 100 may also include one or more current sensors 226 to monitor the current flowing to/from the ultracapacitor cells 204, a first temperature sensor 230 to measure the temperature of the ultracapacitor cells 204, a second temperature sensor 232 to measure the temperature of the DC/DC converter 208, and one or more voltage sensors 234 configured to measure the operating voltage Vo of the voltage supply bus 218.

As further shown in FIG. 2, the electronic controller 206 may also include a digital anti-aliasing filter 228 to filter the operating voltage Vo input from the voltage supply bus 218, thereby providing a filtered operating voltage Vo*. The filtered operating voltage Vo* is filtered to remove noise, such as that produced by the switching of the DC/DC converter 208 or other electrical devices connected to the voltage supply bus 218. The electronic controller 206 is also configured to compare the operating voltage Vo to the upper and lower dead band limits and determine a buck gain if the operating voltage Vo is at or greater than the upper dead band limit and determine a boost gain if the operating voltage Vo is at or below the lower dead band limit. The buck/boost gain is sent to a direction and current control block 220 in the controller 206 to provide the commands for controlling the DC/DC converter 208. A first set of control parameters includes the buck gain. A second set of control parameters includes the boost gain.

As shown in FIG. 2, the buck/boost DC/DC converter 208 is connected in series between the ultracapacitor cell stack 202 in the ultracapacitor module 100 and the voltage supply bus 218 and is operated under the direction of the electronic controller 206. The electronic controller 206 provides the DC/DC converter 208 with the ability to map the ultracapacitor cell stack 202 voltage to the operating voltage Vo. Actively controlling a programmable float voltage Vf is the means of mapping the ultracapacitor cell stack 202 voltage to the operating voltage Vo.

The operating voltage Vo has a relatively large variance range due to temperature, operational tolerances of other components, vehicle-to-vehicle variance, ultracapacitor module life stage, and electrical noise on the voltage supply bus 218. Dual dead bands shown in the electronic controller 206 in FIG. 2 are established to avoid oscillation of the DC/DC converter 208 between boost and buck modes due to small variations of the operating voltage Vo. The dual dead bands between boost and buck modes are as large as, or larger than, the variances and tolerances described above to avoid undesirable switching between boost and buck modes. With large dead bands, the electronic controller 206 cannot minimize a disturbance on the voltage supply bus 218 because control of the voltage supply bus 218 does not begin until the operating voltage Vo is outside the limits of the dead bands. The electronic controller 206 may independently control an upper dead band with an upper dead band limit greater than the target bus voltage value Vt and a lower dead band with a lower dead band limit below the target bus voltage value Vt. The DC/DC converter 208 does not operate in boost mode until the operating voltage Vo is at or below the lower dead band limit and the DC/DC converter 208 will continue to operate in boost mode until the operating voltage Vo is raised/boosted back to the target bus voltage value Vt (or within an acceptable tolerance of the target bus voltage value Vt). Similarly, the DC/DC converter 208 does not operate in buck mode until the operating voltage Vo is at or greater than the upper dead band limit and the DC/DC converter 208 will continue to operate in buck mode until the operating voltage Vo is lowered/bucked back to the target bus voltage value Vt (or within an acceptable tolerance of the target bus voltage value Vt).

Figure 3:
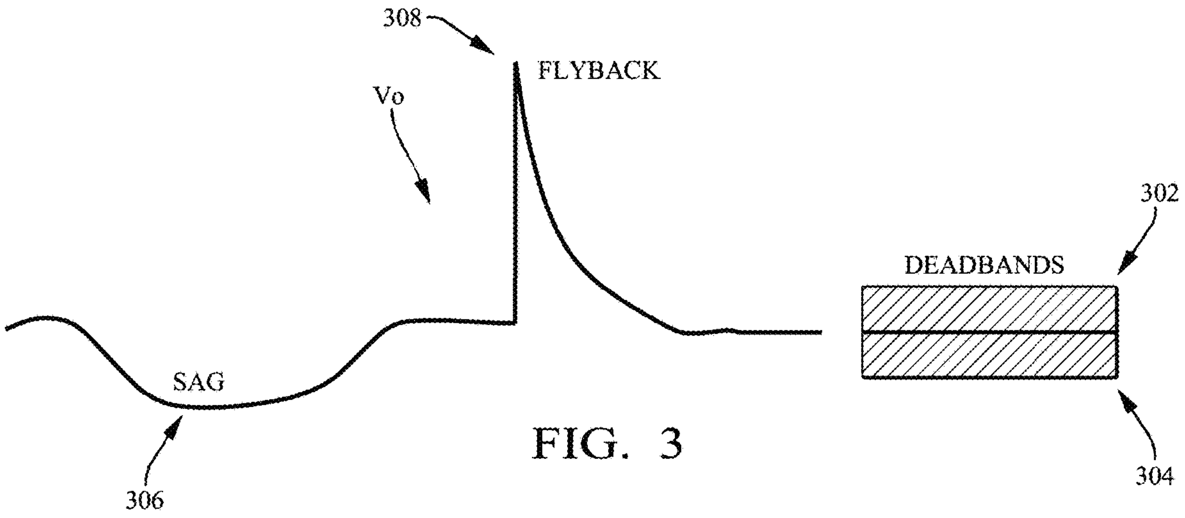
FIG. 3 shows a diagram of voltage fluctuations on the voltage bus and a dead band voltage range for responding to these voltage fluctuations according to some embodiments.

The UCM 100 mitigates several types of voltage fluctuations or transients on the voltage supply bus 218 as shown in FIG. 3. Voltage sags may be caused by turning on high power loads connected to the voltage supply bus 218. Voltage spikes may be caused by turning off high power loads connected to the voltage supply bus 218, most significantly primarily inductive loads. The voltage sags are relatively low power but have longer duration and higher energy while the voltage spikes are of much shorter duration, lower energy, and higher power than the voltage sags. The UCM 100 has different control mechanisms for each type of voltage fluctuation.

To control the two different voltage disturbances on the voltage supply bus 218, the electronic controller 206 has two individual control loops with different gain characteristics for voltage sags and voltage spikes. Each control loop has a dead band so that the DC/DC converter 208 avoids transitioning from boost mode to buck mode during the same transient.

An upper or positive dead band 302, shown in FIGS. 3, prevents undesired transitions to buck mode and a lower or negative dead band 304, shown in FIG. 3, prevents undesired transitions to boost mode. In FIG. 3, the upper and lower dead bands are centered around the target bus voltage value Vt which is determined by the electronic controller 206. In particular the lower dead band 304 shown in FIG. 3 applies to the case of a voltage sag 306. When the operating voltage Vo of the voltage supply bus 218 is at or below a lower dead band limit of the lower dead band 304, the DC/DC converter 208 will boost the operating voltage Vo with current drawn from the ultracapacitor cell stack 202. The upper dead band 302 that is shown in FIG. 3 applies to a voltage spike 308, e.g., caused by a current flyback from an inductive load on the voltage supply bus 218. When the operating voltage Vo of the voltage supply bus 218 is at or greater than an upper dead band limit of the upper dead band 302, the DC/DC converter 208 will buck current from the voltage supply bus 218 to the ultracapacitor cell stack 202, thereby decreasing the operating voltage Vo.

Figure 4:
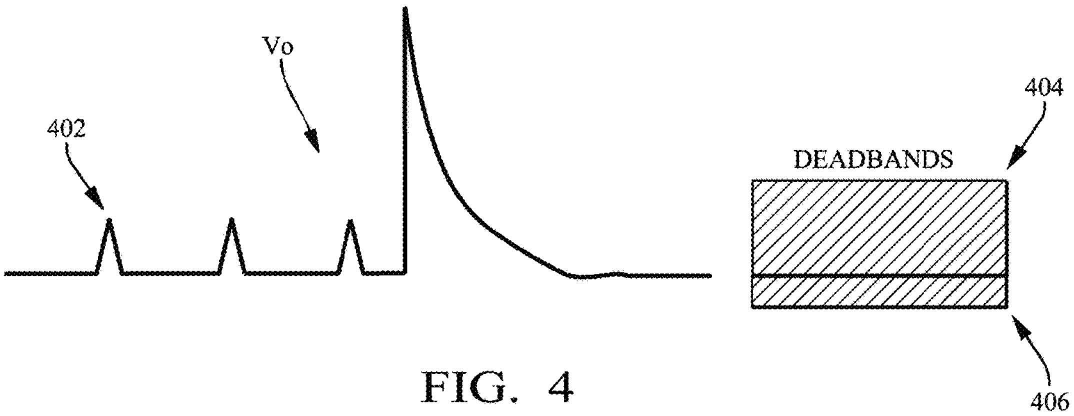
FIG. 4 shows a diagram of small periodic voltage spikes on the voltage bus and a dead band voltage range for responding to these voltage fluctuations according to some embodiments.

FIG. 4 shows an example where small periodic voltage spikes 402 are present on the voltage supply bus 218. To address this issue, the upper dead band limit of the upper dead band 404 may be raised so that the upper dead band 404 is wider than the lower dead band 406.

Figure 5:
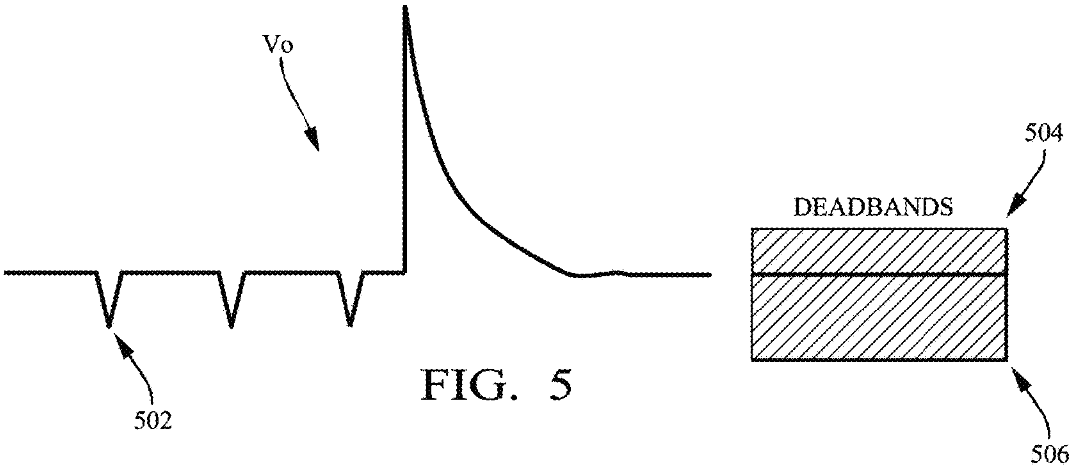
FIG. 5 shows a diagram of small periodic voltage sags on the voltage bus and a dead band voltage range for responding to these voltage fluctuations according to some embodiments.

FIG. 5 shows an example where small periodic voltage sags 502 are present on the voltage supply bus 218. To address this issue, the lower dead band limit of the lower dead band 506 may be lowered so that the lower dead band 506 is wider than the upper dead band 504.

Figure 6:
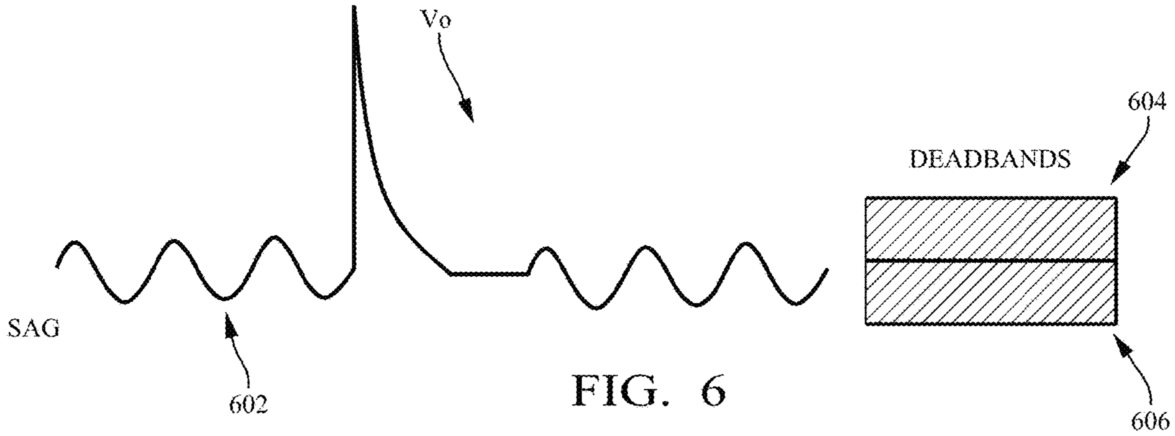
FIG. 6 shows a diagram of electrical noise on the voltage bus having a frequency and a dead band voltage range for responding to these voltage fluctuations according to some embodiments.

FIG. 6 shows an example where a sinusoidal noise 602, e.g., produced by an alternator, is present on the voltage supply bus 218. To address this issue, the upper dead band limit of the upper dead band 604 may be raised and the lower dead band limit of the lower dead band 606 may be lowered so that respective upper and lower dead band limits of the respective upper and lower dead bands 604, 606 exceed the limits of the sinusoidal noise.

Figure 7:
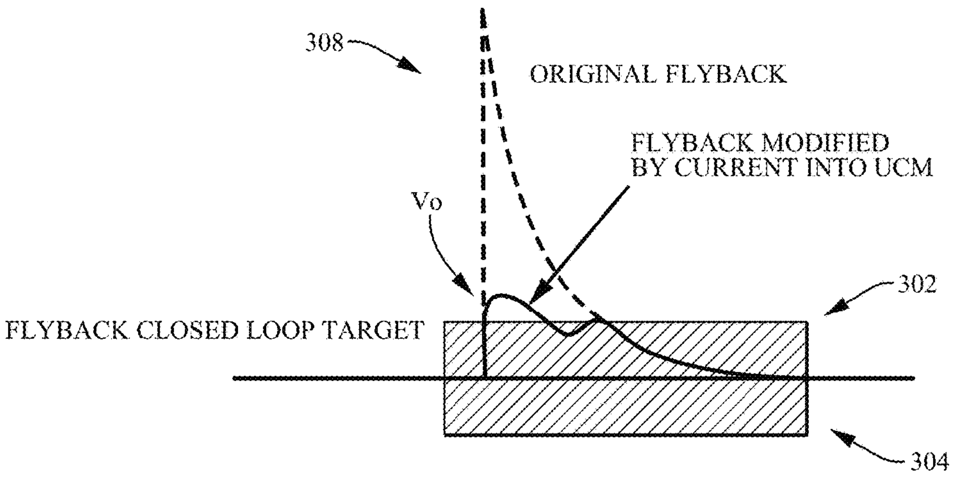
FIG. 7 shows a diagram of a response of the ultracapacitor module to a voltage spike according to some embodiments.
Figure 8:
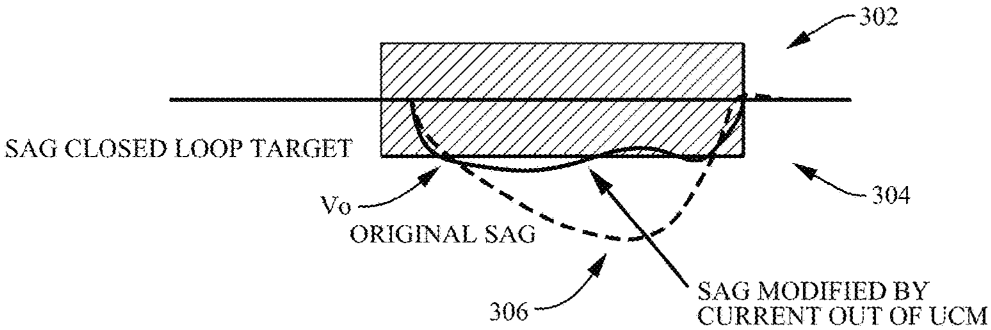
FIG. 8 shows a diagram of a response of the ultracapacitor module to a voltage sag according to some embodiments.

FIG. 7 shows the reduction of the voltage spike 308 by bucking current from the voltage supply bus 218 to the ultracapacitor cell stack 202 of the UCM 100 and FIG. 8 shows the shows the reduction of the voltage sag 306 by boosting the operating voltage Vo with current drawn from the ultracapacitor cell stack 202 of the UCM 100.

To control different types of voltage disturbances (e.g., sags, spikes) on the voltage supply bus 218, the electronic controller 206 has two individual control loops with different gain characteristics. Each control loop has a dead band so that the DC/DC converter 208 avoids transitioning from boost mode to buck mode during the same transient. An upper dead band 302, shown in FIG. 3, prevents undesired transitions to buck mode and a lower dead band 304, shown in FIG. 3, prevents undesired transitions to boost mode. Each of the upper and lower dead bands may have different widths and are disposed on opposite sides of the target bus voltage value Vt, which is controlled by the electronic controller 206. In particular the lower dead band 304 shown in FIG. 3 is disposed below the target bus voltage value Vt and addresses the case of a voltage sag. When the operating voltage Vo of the voltage supply bus 218 is less than a lower dead band limit of the lower dead band 304, the DC/DC converter 208 will boost the operating voltage Vo with current drawn from the ultracapacitor cell stack 202. The upper dead band 302 that is shown in FIG. 3 is disposed above the target bus voltage value Vt and addresses the case of a voltage spike. When the operating voltage Vo of the voltage supply bus 218 exceeds an upper dead band limit of the upper dead band 302, the DC/DC converter 208 will buck current from the voltage supply bus 218 to the ultracapacitor cell stack 202.

Additionally, the electronic controller 206 may measure the direction and frequency content of disturbances on the voltage supply bus 218 and use this information to modify the dead bands. Some examples of this feature are shown in FIGS. 4-6. The dual control loops are shown in FIG. 2. The separate control loops allow for different gains for positive and negative voltage transients. For example, when using proportional-integral-derivative (PID) controllers, the proportional gain, integral gain, and/or derivative gain of the first control loop which controls the DC/DC converter 208 when the operating voltage Vo of the voltage supply bus 218 is greater than the target bus voltage value Vt, i.e., during a voltage spike, may be different than the proportional gain, integral gain, and/or derivative gain of the second control loop which controls the DC/DC converter 208 when the operating voltage Vo of the voltage supply bus 218 is less than the target bus voltage value Vt, i.e., during a voltage sag. Because the UCM 100 has different control loop gains for two different ranges of bus transients, the UCM 100 provides independent compensation for both voltage spikes and voltage sags in the operating voltage Vo of the voltage supply bus 218.

In some embodiments, the target bus voltage value Vt, the upper dead band limit and the lower dead band limit may be set by an external module over a LIN/CAN communication bus so that the UCM 100 operates in a primary/secondary relationship with a vehicle DC/DC converter (not shown). In other embodiments, the target bus voltage value Vt, the upper dead band limit and the lower dead band limit may be set to the same value by an external module over a LIN/CAN communication bus to provide filtering of a sinusoidal noise voltage on the voltage supply bus 218, e.g., caused by an alternator.

Figure 9:
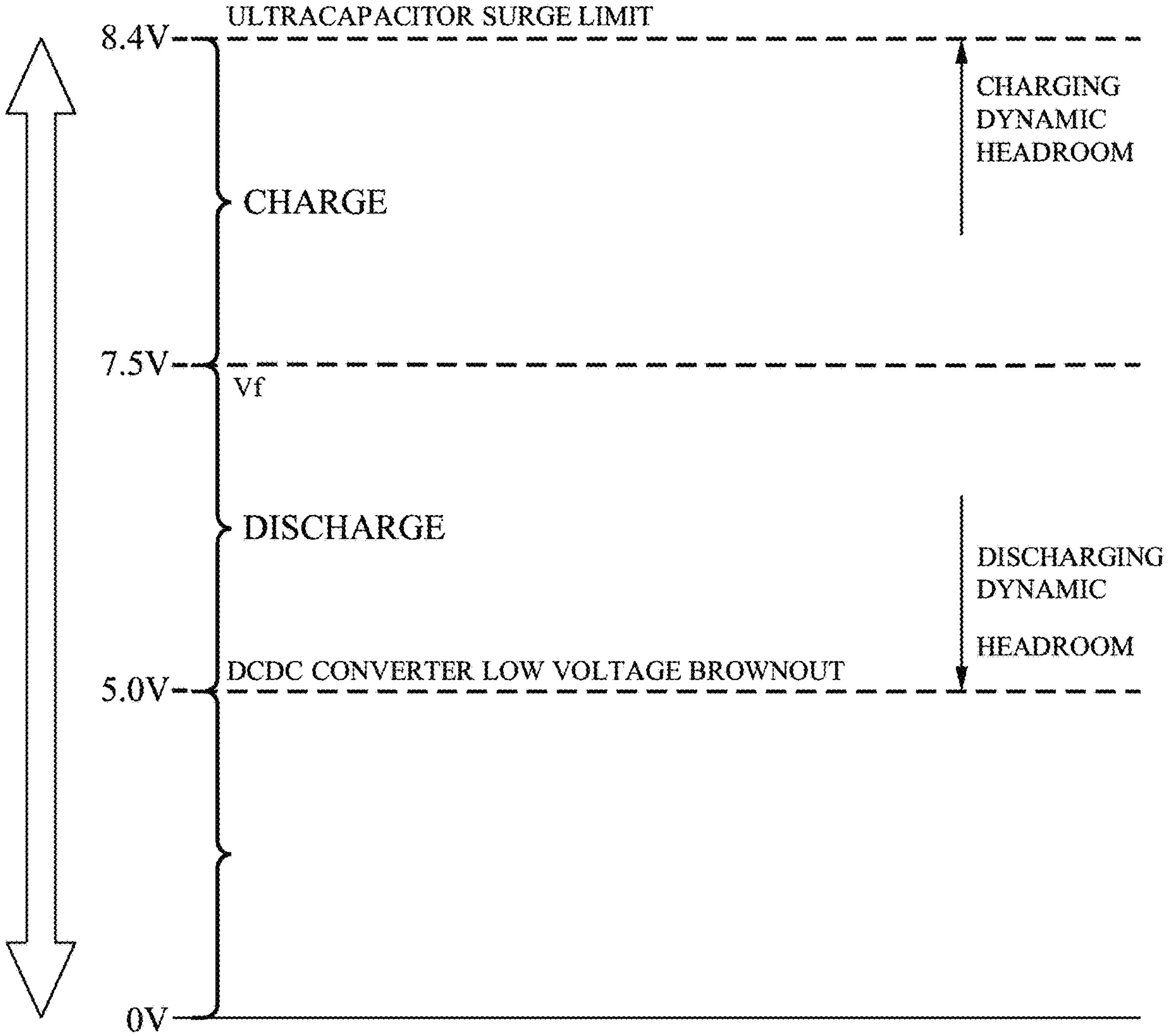
FIG. 9 shows a diagram of a voltage range of an ultracapacitor cell stack and a programmable float voltage of an ultracapacitor module according to some embodiments.

FIG. 9 shows the operating voltage range of the ultracapacitor cell stack 202 between an upper voltage limit (designated as "ULTRACAPACITOR SURGE LIMIT" in FIG. 9) and a lower voltage limit (designated as "DCDC CONVERTER LOW VOLTAGE BROWNOUT" in FIG. 9).

The upper voltage limit is set to protect the ultracapacitor cell stack 202 from absorbing excess voltage from the voltage supply bus 218 that would damage the ultracapacitor cell stack 202. The lower voltage limit is set at a level below which the ultracapacitor cell stack 202 is not able to supply enough power to the DC/DC converter 208 to raise the voltage on the voltage supply bus 218. The programmable float voltage value Vf is set between the upper and lower voltage limits and can be controlled by the electronic controller 206. The float voltage value Vf can be shifted down to increase charging headroom between the float voltage value Vf and the upper voltage limit, which decreases the discharging headroom between the float voltage value Vf and the lower voltage limit. Alternatively, the float voltage value Vf can be shifted up to increase discharging headroom between the float voltage value Vf and the lower voltage limit, which decreases the charging headroom between the float voltage value Vf and the upper voltage limit. The ultracapacitor cell stack 202 is charged to absorb excess voltage on the voltage supply bus 218 and the ultracapacitor cell stack 202 is discharged to provide electrical power to raise the voltage on the voltage supply bus 218.

In some embodiments, the electronic controller 206 disables the DC/DC converter 208 when the operating voltage Vo is within a predetermined dead band voltage range greater than and/or below the target bus voltage value Vt. In this state the switching of the DC/DC converter 208 may be stopped to minimize power consumption, reduce electrical noise, and ensure that no current is flowing into or out of the ultracapacitor cell stack 202.

In some aspects, the techniques described herein relate to an ultracapacitor module, including: an ultracapacitor cell stack containing one or more ultracapacitor cells; a bidirectional boost/buck DC/DC converter, wherein the ultracapacitor cell stack and the DC/DC converter are configured to be connected in series with a voltage supply bus of a vehicle; one or more voltage sensors configured to determine an operating voltage Vo of the voltage supply bus; and an electronic controller in electrical communication with the DC/DC converter and the one or more voltage sensors, wherein the electronic controller is configured to: control the DC/DC converter using a first set of control parameters when the operating voltage Vo is greater than a target bus voltage value Vt, and control the DC/DC converter using a second set of control parameters different from the first set of control parameters when the operating voltage Vo is less than the target bus voltage value Vt.

In some aspects, the techniques described herein relate to an ultracapacitor module, wherein electronic controller is further configured to control the DC/DC converter using the first set of control parameters when the operating voltage Vo is at or greater than an upper dead band limit of an upper dead band voltage range, and control the DC/DC converter using the second set of control parameters when the operating voltage Vo is at or below a lower dead band limit of a lower dead band voltage range.

In some aspects, the techniques described herein relate to an ultracapacitor module, wherein the electronic controller is further configured to disable the DC/DC converter when the operating voltage Vo is within an upper dead band voltage range greater than the target bus voltage value Vt.

In some aspects, the techniques described herein relate to an ultracapacitor module, wherein the electronic controller is further configured to disable the DC/DC converter when the operating voltage Vo is within a lower dead band voltage range below the target bus voltage value Vt.

In some aspects, the techniques described herein relate to an ultracapacitor module, wherein a magnitude of the upper dead band voltage range is different than a magnitude of the lower dead band voltage range.

In some aspects, the techniques described herein relate to an ultracapacitor module, wherein the lower dead band voltage range is determined by the electronic controller based on transitions of the operating voltage Vo relative to the target bus voltage value Vt.

In some aspects, the techniques described herein relate to an ultracapacitor module, wherein the lower dead band voltage range is further determined by the electronic controller based on frequency content of the transitions of the operating voltage Vo relative to the target bus voltage value Vt.

In some aspects, the techniques described herein relate to an ultracapacitor module, wherein the upper dead band voltage range is determined by the electronic controller based on transitions of the operating voltage Vo relative to the target bus voltage value Vt.

In some aspects, the techniques described herein relate to an ultracapacitor module, wherein the upper dead band voltage range is further determined by the electronic controller based on frequency content of the transitions of the operating voltage Vo relative to the target bus voltage value Vt.

In some aspects, the techniques described herein relate to a method of operating an ultracapacitor module connected to a voltage bus of a vehicle, the ultracapacitor module having an ultracapacitor cell stack containing one or more ultracapacitor cells, a bidirectional boost/buck DC/DC converter, wherein the ultracapacitor cell stack and the DC/DC converter are connected in series with the voltage bus, one or more voltage sensors configured to determine an operating voltage Vo of the voltage bus, and an electronic controller in electrical communication with the DC/DC converter and the one or more voltage sensors, the method including: controlling the DC/DC converter using a first set of control parameters when the operating voltage Vo is greater than a target bus voltage value Vt; and controlling the DC/DC converter using a second set of control parameters different from the first set of control parameters when the operating voltage Vo is less than the target bus voltage value Vt.

In some aspects, the techniques described herein relate to a method, wherein the method further includes controlling the DC/DC converter using the first set of control parameters when the operating voltage Vo is at or greater than an upper dead band limit of an upper dead band voltage range, and controlling the DC/DC converter using the second set of control parameters when the operating voltage Vo is at or below a lower dead band limit of a lower dead band voltage range.

In some aspects, the techniques described herein relate to a method, wherein the method further includes disabling the DC/DC converter when the operating voltage Vo is within an upper dead band voltage range greater than the target bus voltage value Vt.

In some aspects, the techniques described herein relate to a method, wherein the method further includes disabling the DC/DC converter when the operating voltage Vo is within a lower dead band voltage range below the target bus voltage value Vt.

In some aspects, the techniques described herein relate to a method, wherein a magnitude of the upper dead band voltage range is different than a magnitude of the lower dead band voltage range.

In some aspects, the techniques described herein relate to a method, wherein the lower dead band voltage range is determined by the electronic controller based on transitions of the operating voltage Vo relative to the target bus voltage value Vt.

In some aspects, the techniques described herein relate to a method, wherein the lower dead band voltage range is further determined by the electronic controller based on frequency content of the transitions of the operating voltage Vo relative to the target bus voltage value Vt.

In some aspects, the techniques described herein relate to a method, wherein the upper dead band voltage range is determined by the electronic controller based on transitions of the operating voltage Vo relative to the target bus voltage value Vt.

In some aspects, the techniques described herein relate to a method, wherein the upper dead band voltage range is further determined by the electronic controller based on frequency content of the transitions of the operating voltage Vo relative to the target bus voltage value Vt.

In some aspects, the techniques described herein relate to a computer readable medium containing program instructions for operating an ultracapacitor module connected to a voltage bus of a vehicle, the ultracapacitor module having an ultracapacitor cell stack containing one or more ultracapacitor cells, a bidirectional boost/buck DC/DC converter, wherein the ultracapacitor cell stack and the DC/DC converter are connected in series with the voltage bus, one or more voltage sensors configured to determine an operating voltage Vo of the voltage bus, and an electronic controller in electrical communication with the DC/DC converter and the one or more voltage sensors, wherein execution of the program instructions by one or more processors of a computer system causes the electronic controller to carry out: controlling the DC/DC converter using a first set of control parameters when an operating voltage Vo is greater than a target bus voltage value Vt; and controlling the DC/DC converter using a second set of control parameters different from the first set of control parameters when the operating voltage Vo is less than the target bus voltage value Vt.

In some aspects, the techniques described herein relate to a computer readable medium, wherein execution of the program instructions by one or more processors of a computer system further causes the electronic controller to control the DC/DC converter using the first set of control parameters when the operating voltage Vo is at or greater than an upper dead band limit of an upper dead band voltage range, and control the DC/DC converter using the second set of control parameters when the operating voltage Vo is at or below a lower dead band limit of a lower dead band voltage range.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An ultracapacitor module, comprising:

an ultracapacitor cell stack containing one or more ultracapacitor cells;

a bidirectional boost/buck DC/DC converter, wherein the ultracapacitor cell stack and the DC/DC converter are configured to be connected in series with a voltage supply bus of a vehicle;

one or more voltage sensors configured to determine an operating voltage Vo of the voltage supply bus; and an electronic controller in electrical communication with the DC/DC converter and the one or more voltage sensors, wherein the electronic controller is configured to:

control the DC/DC converter using a first set of control parameters when the operating voltage Vo is greater than a target bus voltage value Vt, control the DC/DC converter using a second set of control parameters different from the first set of control parameters when the operating voltage Vo is less than the target bus voltage value Vt; and disable the DC/DC converter when the operating voltage Vo is within an upper dead band voltage range greater than the target bus voltage value Vt.

2. The ultracapacitor module in accordance with claim 1, wherein the electronic controller is further configured to control the DC/DC converter using the first set of control parameters when the operating voltage Vo is at or greater than an upper dead band limit of an upper dead band voltage range, and control the DC/DC converter using the second set of control parameters when the operating voltage Vo is at or less than a lower dead band limit of a lower dead band voltage range.

3. The ultracapacitor module in accordance with claim 2, wherein a magnitude of the upper dead band voltage range is different than a magnitude of the lower dead band voltage range.

4. The ultracapacitor module in accordance with claim 2, wherein the lower dead band voltage range is determined by the electronic controller based on transitions of the operating voltage Vo relative to the target bus voltage value Vt.

5. The ultracapacitor module in accordance with claim 4, wherein the lower dead band voltage range is further determined by the electronic controller based on frequency content of the transitions of the operating voltage Vo relative to the target bus voltage value Vt.

6. The ultracapacitor module in accordance with claim 2, wherein the upper dead band voltage range is determined by the electronic controller based on transitions of the operating voltage Vo relative to the target bus voltage value Vt.

7. The ultracapacitor module in accordance with claim 6, wherein the upper dead band voltage range is further determined by the electronic controller based on frequency content of the transitions of the operating voltage Vo relative to the target bus voltage value Vt.

8. The ultracapacitor module in accordance with claim 1, wherein the electronic controller is further configured to disable the DC/DC converter when the operating voltage Vo is within a lower dead band voltage range less than the target bus voltage value Vt.

9. A method of operating an ultracapacitor module connected to a voltage bus of a vehicle, the ultracapacitor module having an ultracapacitor cell stack containing one or more ultracapacitor cells, a bidirectional boost/buck DC/DC converter, wherein the ultracapacitor cell stack and the DC/DC converter are connected in series with the voltage bus, one or more voltage sensors configured to determine an operating voltage Vo of the voltage bus, and an electronic controller in electrical communication with the DC/DC converter and the one or more voltage sensors, the method comprising:

controlling the DC/DC converter using a first set of control parameters when the operating voltage Vo is greater than a target bus voltage value Vt;

controlling the DC/DC converter using a second set of control parameters different from the first set of control parameters when the operating voltage Vo is less than the target bus voltage value Vt; and disabling the DC/DC converter when the operating voltage Vo is within an upper dead band voltage range greater than the target bus voltage value Vt.

10. The method in accordance with claim 9, wherein the method further comprises controlling the DC/DC converter using the first set of control parameters when the operating voltage Vo is at or greater than an upper dead band limit of an upper dead band voltage range, and controlling the DC/DC converter using the second set of control parameters when the operating voltage Vo is at or less than a lower dead band limit of a lower dead band voltage range.

11. The method in accordance with claim 10, wherein a magnitude of the upper dead band voltage range is different than a magnitude of the lower dead band voltage range.

12. The method in accordance with claim 10, wherein the lower dead band voltage range is determined by the electronic controller based on transitions of the operating voltage Vo relative to the target bus voltage value Vt.

13. The method in accordance with claim 9, wherein the method further comprises disabling the DC/DC converter when the operating voltage Vo is within a lower dead band voltage range less than the target bus voltage value Vt.

* * * * *